United States Patent Office 3,338,811
Patented Aug. 29, 1967

3,338,811
PHOTOCHLORINATION OF ALKYL
AROMATIC COMPOUNDS
Noah Soffer and Leonard M. Shorr, Haifa, Israel, assignors to Kaiser Aluminum & Chemical Corporation, Oakland, Calif., a corporation of Delaware
No Drawing. Filed Sept. 21, 1964, Ser. No. 398,035
11 Claims. (Cl. 204—163)

The present invention relates to a method for chlorinating alkyl aromatic compounds and, more particularly, it is directed to a method for greatly increasing the efficiency of the chlorination reaction.

When side chain chlorination of alkyl aromatic compounds in the liquid phase is carried out by photochemical methods, a number of serious drawbacks arise that prevent good yields of the chlorinated product. For example, when toluene is chlorinated in the presence of light in the liquid phase, a considerable amount of tar formation and dark discoloration of the reaction mass occur before the conversion of toluene to benzotrichloride is completed. The tarry by-products and dark discoloration of the mixture severely affect the overall efficiency of the reaction and analysis of reaction products manufactured according to these processes indicates that, in most instances, only 35%–40% of the toluene is converted to benzotrichloride.

Furthermore, it is difficult to recover that portion of the reaction product that has been chlorinated because the tarry by-products tend to polymerize and decompose during distillation of the reaction mixture for recovery of the chlorinated product. In addition, photochemical substitution of chlorine on the alkyl groups attached to a single aromatic nucleus is favored by high temperatures, preferably at or near the boiling temperature of the compound being chlorinated. However, discoloration of the reaction mixture occurs even more rapidly at high temperatures and as the mixture darkens or even becomes opaque the light can no longer penetrate the reaction mixture to exert its catalytic effect, and the reaction terminates prior to completion. Because of discoloration of the reaction mixture and by-product formation, photochemical chlorination reactions have usually been performed in the vapor phase.

Another problem associated with photochemical chlorination processes is the difficulty of directing the incoming chlorine atom onto the side chain rather than onto the aromatic nucleus of the compound being chlorinated. When side chain chlorination of alkyl aromatic compounds is attempted, undesirable nuclear substitution often occurs thereby forming unwanted materials. It is thought that metallic impurities, particularly iron and aluminum, cause nuclear chlorination and heretofore avoiding nuclear chlorination has required time-consuming and expensive purifications to eliminate even trace amounts of metallic impurities from the reaction environment. Trace amounts of metals may come from equipment, containers, or even atmospheric dust as well as being present as impurities in the reactants.

The instant invention overcomes the above problems by providing an effective and economical liquid phase process for chlorinating alkyl groups on alkyl aromatic hydrocarbons containing a single aromatic nucleus. This process includes effecting chlorination in the presence of a compound, hereinafter referred to as an inhibitor, having the structure:

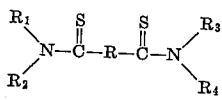

where $R_1$, $R_2$, $R_3$, and $R_4$ are hydrogen, alkyl or aryl and R is S, S–S, or S–Zn–S. Examples of suitable inhibitors are tetramethylthiuram disulfide, the zinc salt of ethyl phenyl dithiocarbamic acid, dimethyl thiuram disulfide and tetrabutyl thiuram monosulfide. The alkyl radicals on the aromatic hydrocarbons may be fully or partially chlorinated even at high temperatures following the procedure of this invention without substantial darkening of the reaction mass or the formation of tarry by-products. Thus, reaction time required to prepare chlorinated compounds is less and the catalytic effect of light is not substantially diminished.

Although the invention is not restricted to making highly chlorinated compounds it is particularly applicable to preparing compounds containing a total of at least three chlorine atoms substituted on methyl groups, such as benzotrichloride and xylene hexachloride. During photochemical chlorination tarry by-products form in increasing amounts as chlorination proceeds. Therefore, while preparing benzyl chloride and benzal chloride is not particularly troublesome by prior methods, benzotrichloride has been extremely difficult to prepare. However, even for preparing low chlorinated products, such as benzyl chloride, this invention is advantageous because it avoids formation of the tarry by-products during chlorination which later polymerize and decompose during distillation of the reaction products thereby rendering recovery of chlorinated products difficult.

According to the present invention an alkyl aromatic compound containing a single aromatic nucleus which may be substituted with chlorine, methyl, chloromethyl or any combination thereof can be chlorinated in the liquid phase at elevated temperatures by introducing gaseous chlorine into the aromatic compound and irradiating the mixture with light in the presence of an effective amount of the inhibitor. It has been discovered that photochemical chlorination reaction of an alkyl aromatic compound containing a single aromatic nucleus will result in increased yields of the side-chain chlorinated product if the reaction is effected in the presence of the inhibitor. Moreover, it has been found that an extremely small amount of the inhibitor is effective to restrict the reaction to chlorination of the side chain rather than the nucleus. Furthermore, although the temperatures used during the reaction are high, that is, the boiling temperature of the reaction mixture, tarry by-products do not form to interfere with the successful completion of the reaction, nor does darkening of the reaction mass occur to interfere with the catalytic effect that light exerts on the reaction.

The compounds that can be photochemically chlorinated are alkyl aromatic hydrocarbons containing a single aromatic nucleus and having at least one alkyl group attached to the nucleus thereby forming a side-chain. Some specific examples of compounds coming within the scope of the invention are toluene, xylene, mesitylene, butyl benzene and durene. In addition, chloro-alkyl aromatics containing chlorinated alkyl side chains may be further chlorinated to a higher chloro-alkyl stage in accordance with this invention. For example, benzyl chloride may be chlorinated to benzal or benzo chloride. Likewise, xylenes, butyl benzene, mesitylenes and durenes and nuclear chloro substituted derivatives thereof containing partially chlorinated alkyl groups may also be chlorinated to a higher chlorine content in their side chains in accordance with this invention.

The inhibitor apparently influences the reaction as a catalyst because it permits the photochemical chlorination reaction of alkyl groups on the aromatic nucleus to go to completion, but it prevents nuclear chlorination and side reactions characterized by the discoloration of the reaction mass and the formation of tarry by-products.

The effective amount of inhibitor used may vary within a wide range and almost any amount will cause the desired effect to some extent. For example, from about 0.01% up to about 1.0% based on the weight of the alkyl aromatic hydrocarbon being chlorinated has been found effective, and preferably from 0.1% to 0.15% is employed. Larger quantities may be used in the reaction without detrimental results.

The light required to photochemically catalyze the reaction is not critical and it may be chosen from a wide range of sources. Adequate catalytic effects can be obtained by exposing the reaction mixture to any suitable source of light, such as the light from an ordinary incandescent lamp. However, it has been found that better results are obtained when the reaction mixture is irradiated with actinic light from a mercury vapor lamp.

Chlorine gas from any suitable source may be used in the photochemical reaction. A large excess of chlorine may be used if chlorination of all the alkyl groups on the aromatic nucleus is desired and lesser amounts if incomplete chlorination is desired.

Chlorination of the alkyl groups on the aromatic nucleus can be conducted within a wide temperature range, and raising the temperature increases the rate of reaction. High temperatures can be used in the process of this invention because substantially no discoloration or tarry by-products are formed during the reaction due to the presence of the inhibitor. The reaction is preferably carried out at the reflux temperature of the reaction mixture or the material being chlorinated. In view of the fact that chlorination can be carried out at reflux temperatures the time for successful completion of the reaction is reduced considerably. For example, substantially complete chlorination of benzyl chloride to benzotrichloride can be obtained within 7 hours in the presence of the tetramethylthiuram disulfide whereas after 11 hours of reaction without it, only a 38% yield of benzotrichloride was obtained under the same reaction conditions.

The following examples are presented to illustrate this invention, but should not be construed as limiting it. It should be noted that Examples 1 and 2 and 9 do not illustrate this invention, but show the results of liquid phase photochemical chlorination in the absence of the inhibitor. In contrast, Examples 3 to 8 illustrate the reactions carried out according to the teachings of the present invention utilizing various of the inhibitors.

*Example 1*

640 mls. of toluene was added to a three-necked flask and brought to a boil. Chlorine gas was passed through the toluene and the reaction mixture was irradiated with a 25 watt mercury vapor lamp. The reaction mixture was maintained between about 110° C. and 125° C. for about 18 hours. After 18 hours it was evident that there was insufficient refluxing and illumination to carry the reaction to completion because the reaction mixture turned dark black and a large amount of tarry solids appeared. A second 175 watt mercury vapor lamp was then directed at the adaptor where reflux occurred and the temperature was raised to 185° C. and maintained there for an additional 8 hours, and then to 200° C. for still an additional 8 hours, at all times under conditions of continuous reflux. The reaction was stopped at this point and, in addition to the chlorinated product, a large amount of dark resinous residue was observed as a precipitate. Reaction products boiling below 145° C. at 30 mm. were removed by distillation. Gas chromatographic analysis of the distillate indicated that it contained about 14.5% of benzyl chloride and about 79.2% benzal chloride. The balance was composed of high boilers. No benzotrichloride was obtained.

*Example 2*

In a three-necked flask provided with chlorine gas at the same rate as in Example 1, 960 mls. of toluene were introduced. The toluene was heated to the boiling point and chlorine gas was passed through it while the reaction mixture was illuminated with a 175 watt mercury vapor lamp. The boiling temperature reached 180° C. (after 12 hours) and was maintained between 180 and 198° C. under continuous reflux for another 19 hours. The mixture turned black after several hours and tarry solid precipitates formed after about 17 hours. The reaction mixture was distilled at 30 mm. of Hg and at 101–104° C. A large amount of dark resinous residue remained after the chlorinated products, which included benzyl chloride and benzal chloride in amounts approximating the results obtained in Example 1, were recovered. No benzotrichloride was obtained.

*Example 3*

The distillates from Examples 1 and 2 were combined and the process was carried out as described in Example 1 except that about 0.1% by weight of tetramethylthiuram disulfide was added to the aromatic compound being chlorinated. The mixture was irradiated with a 175 watt mercury vapor lamp while chlorine gas was passed through it at the same rate as in Example 1 and the reflux temperature of the mixture was maintained for about 24 hours after which the reaction was stopped. The resulting mixture was slightly colored but completely translucent, and no solid or tarry residues were formed. Upon distillation, the reaction mixture yielded 88% benzotrichloride.

*Example 4*

99 grams of benzyl chloride and 0.01% by weight of tetramethylthiuram disulfide were introduced into a three-necked flask. Chlorine gas was passed through the flask and the mixture was heated to boiling under reflux conditions. The flask and zone of refluxing were illuminated separately with 125 watt mercury vapor lamps. Benzyl chloride foamed considerably but after about 4 hours the yellow reaction mixture turned clear red and foaming stopped. Reflux conditions were maintained for an additional three hours after which the reaction was stopped and the mixture distilled. A conversion of 70% of the benzyl chloride to benzotrichloride was obtained.

*Example 5*

In a three-necked flask, 250 mls. of toluene were mixed with 250 mgs. of tetramethylthiuram disulfide and the mixture was heated to its boiling point while being stirred. Chlorine gas was passed through the mixture at the same rate as in Example 1 while it was irradiated with two 175 watt mercury vapor lamps. The reaction mixture was boiled and maintained under reflux conditions during the reaction, the temperature ranging from about 110–220° C. for about 12 hours. The reaction proceeded smoothly with no formation of tarry or solid by-products, yielding 75% conversion of toluene to benzotrichloride.

*Example 6*

Results similar to those obtained in Example 5 were obtained when the Zn salt of ethyl phenyl dithiocarbamic acid was substituted for tetramethyl thiuram disulfide.

*Example 7*

Results similar to those obtained in Example 6 were obtained when dimethyl thiuram disulfide was used instead of the Zn salt of ethyl phenyl dithiocarbamic acid.

*Example 8*

In a three-necked flask, 250 mls. of n-butyl benzene and 0.2% by wt. of tetrabutyl thiuram mono sulfide were mixed and heated to boiling. Chlorine gas was passed through the mixture while it was irradiated with two 175 watt mercury vapor lamps. The reaction mixture was maintained under reflux conditions during 12 hours. The chlorinated product was a yellowish brown clear liquid containing 30% of unreacted n-butyl benzene and no tars.

Example 9

Chlorination of 250 mls. of n-butyl benzene under conditions similar to those of Example 8, but in the absence of an inhibitor, resulted in considerable discoloration and tar formation.

Similar results can be obtained by liquid phase photochemical chlorination of the alkyl groups of other mononuclear alkyl aromatic compounds. Tarry by-products, dark discoloration of the reaction mixture and nuclear chlorination do not occur when the inhibitor is used in the process and a high yield of alkyl chlorinated products is obtained.

This invention thus provides a simple and effective method for chlorinating alkyl substituted mononuclear aromatic compounds in a relatively short period of time under conditions that prevent the formation of tarry by-products which make distillation and irradiation of the fully or partially chlorinated products most difficult and high yields impossible. This process thereby provides an inexpensive method to obtain an abundance of materials that are necessary starting materials in the manufacture of pharmaceuticals, perfumes, dyes, resins and many other organic materials.

What is claimed is:

1. A process for chlorinating alkyl groups on a mononuclear alkyl aromatic compound which comprises mixing at least about 0.01% by weight of an inhibitor having the formula

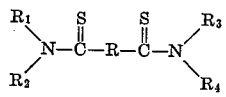

where $R_1$, $R_2$, $R_3$ and $R_4$ are selected from the group consisting of hydrogen, alkyl and aryl and R is selected from the group consisting of S, S—S, and S–Zn–S with said alkyl aromatic compound, introducing chlorine gas into the resultant mixture, irradiating said mixture with light and maintaining said mixture at elevated temperatures in the liquid phase until the desired amount of chlorination is obtained.

2. A process for chlorinating alkyl groups on mononuclear alkyl aromatic compounds which comprises mixing at least about 0.01% by weight of an inhibitor having the formula

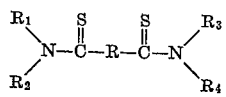

where $R_1$, $R_2$, $R_3$ and $R_4$ are selected from the group consisting of hydrogen, alkyl and aryl and R is selected from the group consisting of S, S—S, and S–Zn–S with said alkyl aromatic compound, introducing chlorine gas into the resultant mixture, irradiating said mixture with light and maintaining said mixture at boiling under reflux conditions and in the liquid phase until the desired amount of chlorination is obtaned.

3. A process for chlorinating toluene which comprises mixing at least about 0.01% by weight of an inhibitor having the formula

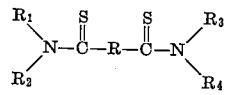

where $R_1$, $R_2$, $R_3$ and $R_4$ are selected from the group consisting of hydrogen, alkyl and aryl and R is selected from the group consisting of S, S—S, and S–Zn–S with toluene, introducing chlorine into the resultant mixture, irradiating said mixture with light and maintaining said mixture at elevated temperatures in the liquid phase until the desired chlorination is obtained.

4. The process according to claim 3 wherein chlorination is continued until the methyl group is perchlorinated.

5. The process of claim 1 wherein said inhibitor is tetramethylthiuram disulfide.

6. The process of claim 1 wherein said inhibitor is dimethylthiuram disulfide.

7. The process of claim 1 wherein said inhibitor is tetrabutylthiuram monosulfide.

8. The process of claim 1 wherein said inhibitor is the Zn salt of ethyl phenyl dithiocarbamic acid.

9. A process for preparing benzotrichloride which comprises mixing at least about 0.01% by weight of tetramethylthiuram disulfide with toluene, introducing gaseous chlorine into the resultant mixture, irradiating said mixture with actinic light and maintaining said mixture at elevated temperatures in the liquid phase until benzotrichloride is obtained.

10. A process for preparing benzotrichloride which comprises mixing at least about 0.01% by weight of tetramethylthiuram disulfide with toluene, introducing gaseous chlorine into the resultant mixture, irradiating said mixture with actinic light and maintaining said mixture at boiling under reflux conditions and in the liquid phase until benzotrichloride is obtained.

11. A process according to claim 10 wherein 0.01% to about 1.0% by weight of tetramethylthiuram disulfide is mixed with toluene.

References Cited
UNITED STATES PATENTS 2,446,430  8/1948  Norton _____ 204—163
2,994,653  8/1961  Miller _____ 204—163

JOHN H. MACK, *Primary Examiner.*

H. S. WILLIAMS, *Assistant Examiner.*